Patented May 19, 1925.

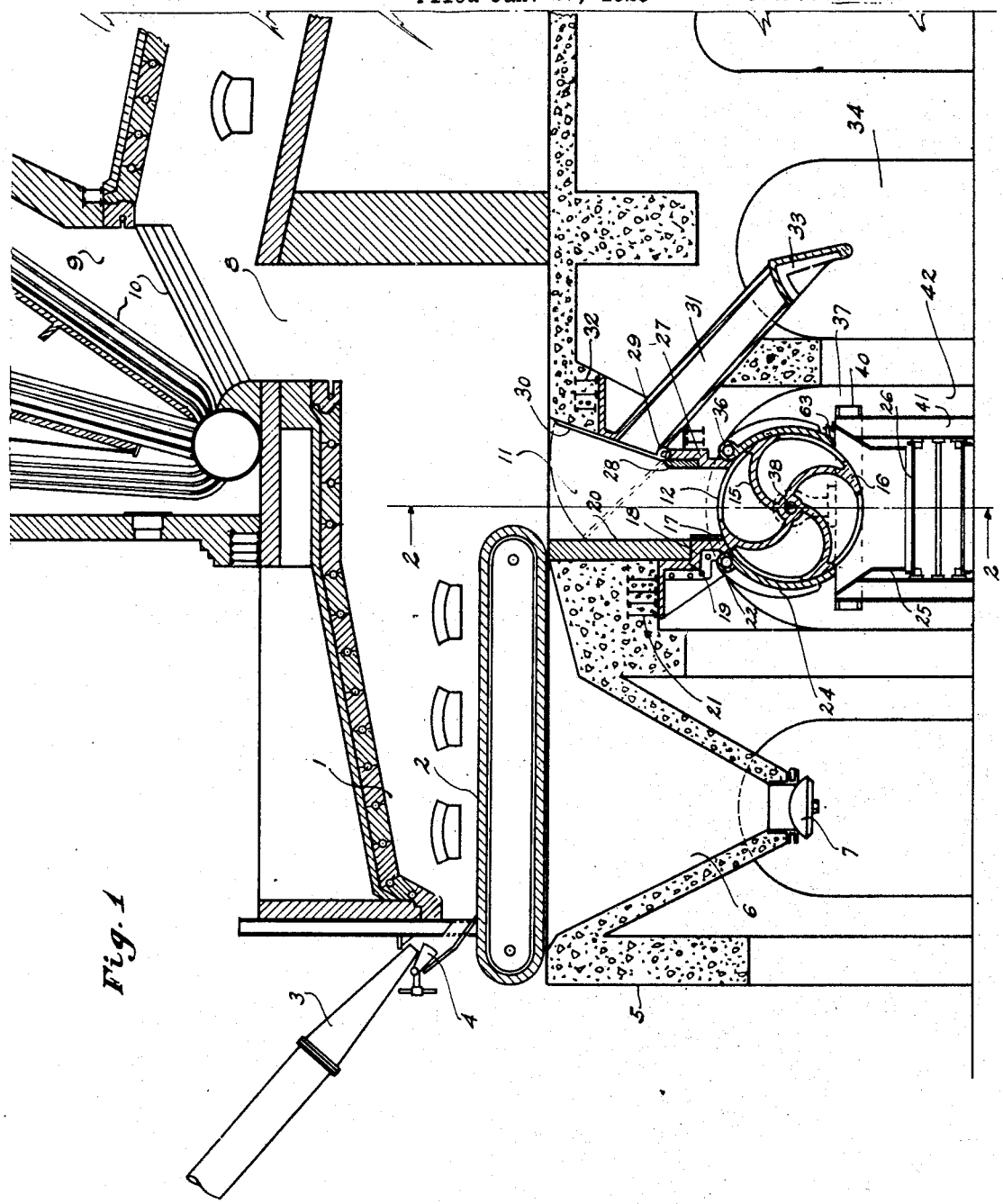

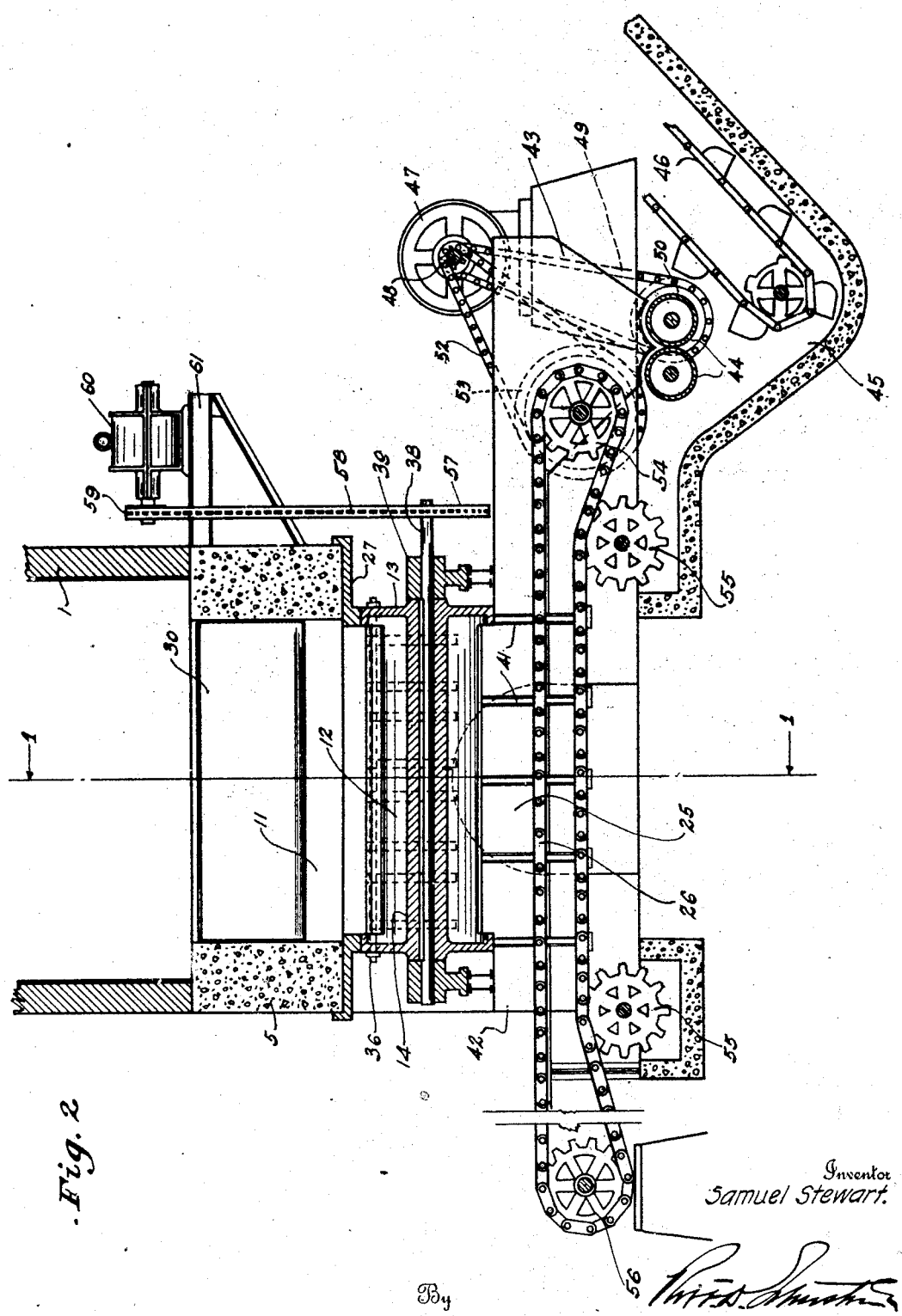

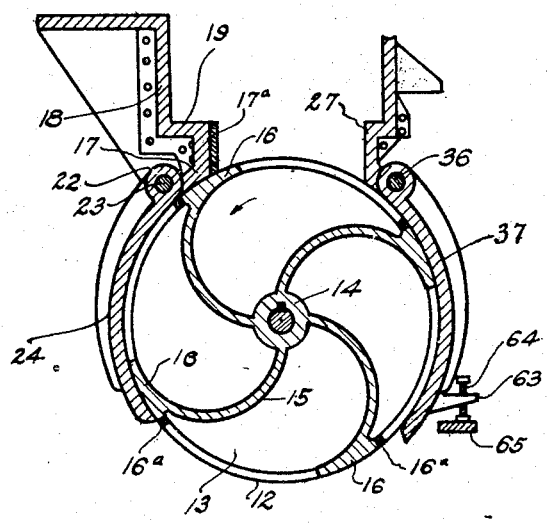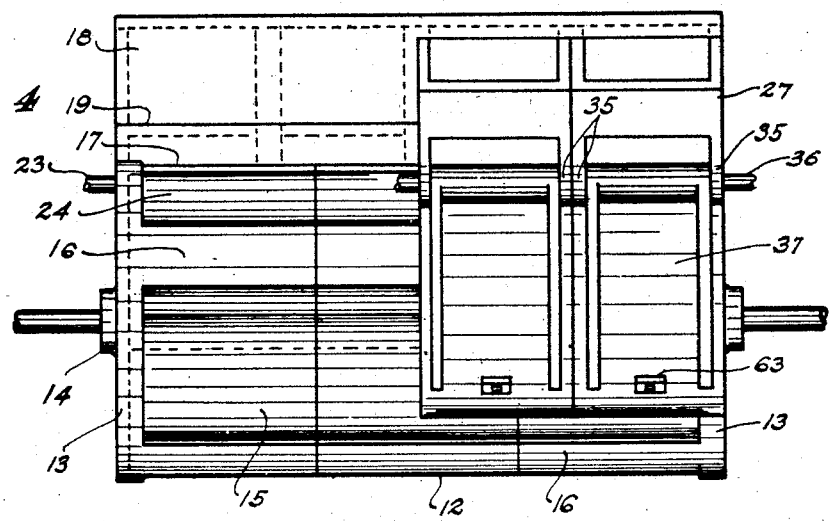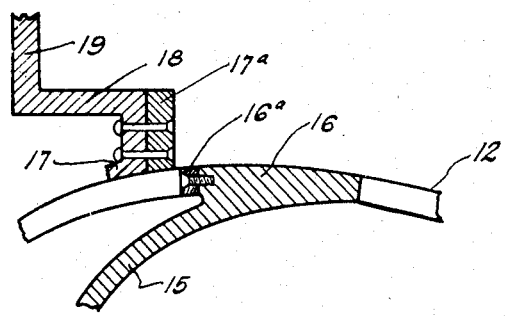

1,538,450

UNITED STATES PATENT OFFICE.

SAMUEL STEWART, OF BIRMINGHAM, ALABAMA.

ASH-DISPOSAL APPARATUS.

Application filed January 27, 1923. Serial No. 615,402.

*To all whom it may concern:*

Be it known that I, SAMUEL STEWART, a citizen of the United States of America, residing at Birmingham, in the county of Jefferson and State of Alabama, have invented certain new and useful Improvements in Ash-Disposal Apparatus, of which the following is a specification.

My invention relates to an apparatus for the disposal of ashes, cinders, clinkers and the like from fuel burning furnaces, and more particularly from stoker fired furnaces wherein there is a tendency for very large clinkers to be produced which cause much trouble in the disposition thereof and have heretofore made it largely necessary to utilize labor for the breaking up and handling of the large clinkers which have rendered inoperative automatic disposal apparatus.

It is one object of my invention to adapt the stoker to discharge the clinkers thereon through a chute of substantially equal width with the stoker and without partitions so that there is no likelihood of wide clinkers choking the chute.

A further object is to provide the wide chute or hopper, which receives the clinkers and ash from the grate, with yieldable sides and with a bottom rotary ejector having pockets preferably extending the length thereof.

A further object is to form the yieldable side guards for the rotary ejector in sections so that only that portion which is engaged by a large clinker need give or yield before it, and I thereby avoid high friction in the apparatus or possibility of the apparatus becoming jammed by the particles getting between a part of the rotor and a side guard.

A further object is to provide above the yielding guards a stationary shearing or cutting edge with which rotating shearing or cutting edges on the ejector will co-operate to shear and cut the larger clinkers and permit their ready discharge into the ash conveyor below the ejector.

A further advantage of my invention is that by the utilization of the ejector I can maintain the bottom end of the chute closed against air admission to the combustion chamber or heat transfer chamber so that the walls of the boiler setting can be opened up sufficiently to expose the traveling ash conveyor below the chute throughout its length, thereby facilitating its inspection and repair.

My invention also contemplates the association with the main discharge chute having the bottom ejector of an auxiliary side chute normally closed by a valve which can be moved into position to divert all of the ashes and other products falling from the stoker through this auxiliary chute, when such is desired.

My invention also comprises the novel details of construction and the arrangements of parts which are hereinafter more particularly described and illustrated in their preferred embodiment in the accompanying drawings, in which:—

Fig. 1 is a vertical longitudinal sectional view taken on the line 1—1 of Fig. 2.

Fig. 2 is a transverse vertical sectional view taken on the line 2—2 of Fig. 1.

Fig. 3 is a detail view in vertical cross-section through the rotary ejector and its guards.

Fig. 4 is a side elevation of Fig. 3 with part of the guards removed.

Fig. 5 is a detail view of removable shearing plates on the chute and rotary ejector.

Similar reference numerals refer to similar parts throughout the drawings.

While it is to be understood that my invention is adapted for use with any type of furnace, I have illustrated it in the drawings as used in a furnace 1 having any suitable type of grate or traveling stoker 2 to which fuel is fed in any suitable manner, as by means of a chute 3 under control of a valve 4. The stoker is shown suitably mounted in the setting 5 above a hopper 6 closed by a bottom door 7, and the products of combustion from the fuel on the stoker flow upwardly through the passage 8 and enter a heat transfer chamber 9 wherein are disposed boiler tubes 10 as typical of any suitable heat transfer agencies. The stoker at its inner end discharges all clinkers, ash and unconsumed matter into a chute 11 formed in the setting and preferably extending from side to side thereof of equal width with the stoker so that clinkers having the width of the stoker itelf can readily fall downwardly through this chute and be received and acted upon by the rotary ejector 12.

This ejector is preferably in the form of an elongated casting, though it can be fabricated if desired, and is formed by parallel end walls 13 which are connected at their centers by a longitudinal hub 14 which as shown is integral with the longitudinal vanes 15 which are properly curved in cross section so that they will present a concave supporting surface for all of the material in a pocket and thus will support the weight of said material until the pocket has been rotated sufficiently to discharge its contents below the guards hereinafter described. Each rib 15 at its outer edge is formed integral with, or carries a shearing or cutting edge or bar 16 which is preferably either itself of sufficiently hard material or is faced with a wear plate 16$^a$ having a cutting edge adapted to co-operate with a cutting edge 17 at the bottom of a hanger casting 18 which is mounted in the side wall of the chute 11 towards which the upper periphery of the ejector rotates and which is provided with a shelf or shoulder 19 above it upon which a refractory lining 20 for the chute rests. The casting 18 is suitably anchored to the I-beam or other rigid structural members 21 of the setting and mounted to have great strength and to resist heavy shearing strains from clinkers and foreign matter in the ejector pockets. The hanger casting 18 is provided on its outer lower face with a series of aligning hinge eyes 22 through which I insert a continuous hinge pin 23, there being pivotally mounted on this pin between each adjacent pair of supporting lugs 22 a section of an outwardly swinging concavo-convex guard 24 which conforms in its concave face to the periphery of the ejector and which is so hung as to be held by gravity yieldingly against the side of the ejector. The lower ends of the guards 24 will just swing clear of the adjacent side wall 25 of the chute which directs the ashes falling from the ejector pockets onto the endless conveyor 26 which travels along the bottom of said chute. The guards 24 subtend a sufficient arc about the periphery of the ejector to hold a pocket therein closed until it has passed out of communication with the chute 11 and preferably until the bottom wall of such pocket has assumed position well above the conveyor. In order that the empty pockets coming into position beneath the chute 11 shall not afford free access of air into the furnace, I provide a hanger casting 17 and this casting is also provided with a shoulder to support a short section of refractory lining 28 and is formed with hinge eyes for receiving a hinge pin 29 by means of which a swinging gate or valve 30 is hinged and disposed to close a lateral auxiliary ash discharge chute 31. This chute at its upper end is suitably connected to I-beams 32 or like supporting elements of the setting and it is disposed at an incline so that the valve 30 will remain closed until it is swung over to cut off the passage of ashes to the ejector 12 and divert the latter through chute 31, whence it is discharged under control of gates 33 into any suitable receptacle or conveyor provided in a suitable chamber 34 of the setting disposed alongside of the chamber for the endless conveyor 26. This casting 27 is provided with hinge eyes 35 which receive a hinge pin 36 and I mount on this hinge pin between each pair of eyes concavo-convex swinging guard sections 37, similar to 24, and adapted to close the pockets as they move upwardly into register with the chute 11. These guards also overhang the right hand wall of the conveyor chute 25. The ejector is mounted on a shaft 38 keyed in the hub and having its outer ends mounted to turn in bearings 39 mounted on I-beams 40 which in turn are supported by the channels or I-beams 41 which carry the guides or supports for the endless conveyor. The sections of the hinged guards 24 and 37 are all duplicate castings which, when assembled, form in effect a continuous swinging guard or closure on each side of the ejector and each section is free to move independently of the others to reduce to a minimum the inlet of air when any obstruction gets between the ejector and the guard. The boiler setting is provided with end openings 42 through which the endless conveyor 26 passes and by means of which the conveyor can be inspected and repaired throughout its entire flight. In accordance with established practice this conveyor may pass under a battery of furnaces and deliver the ashes and clinkers from all to a common discharge chute or hopper 43. This chute is closed at its bottom by a pair of crushing rolls 44 which discharge the crushed material into the boot 45 of an elevator 46. A motor 47, by means of a double sprocket 48, chain 49 and sprocket 50 on one of the crusher rollers 44 acts to drive the latter, and this same motor, by means of the sprocket 48, chain 52 and sprocket 53, may drive the sprocket 54 which moves the endless conveyor. This conveyor returns over idler sprockets 55 and about an end sprocket 56, these several sprockets being mounted in suitable bearings. On the end of the ejector shaft is mounted a sprocket 57 which is shown driven by a chain 58 from a sprocket 59 on the shaft of the motor 60. This motor is shown mounted on a bracket 61 fast to the side of the setting.

In Fig. 5 I have illustrated in detail the utilization of separate replaceable cutting bars adapted to be attached both to the casting 17 and to the forward edges of the webs at the peripheral end of each vane 15 in the ejector. The cutting plate 17ᵃ is shown mounted by countersunk bolts or rivets to the casting 17 and the cutting plate 16ᵃ is shown similarly connected to the forward edge of each longitudinal web 16 at the outer end of each vane 15.

In operation, the motors will be driven continuously and the ejector will be turning slowly in its bearings in the direction of the arrow shown in Fig. 3. Assuming the gate 30 disposed for the ashes and the clinkers to be delivered to the ejector, as the ashes and clinkers fall down through the chute 11 they fall into the pockets of the ejector as the latter are successively presented in receiving position at the bottom of the chute. Clinkers the full width of the stoker can fall through the chute into an ejector pocket. Any clinkers or foreign matter projecting above the periphery of the ejector will be carried forward until it strikes the casting 17 or the cutting plate 17ᵃ and will be arrested by this until it is sheared by the cutting edge or plate 16ᵃ on the ejector, and any part so sheared or detached from the portion in the ejector will fall into the succeeding pocket and if necessary will be again sheared until it can all be passed out. If any part of the clinker or foreign matter gets between the ejector and the swinging guards 24, the latter will yield sufficiently to permit it to pass without causing undue friction on the guard or an abnormal load on the drive of the ejector. The swinging guards will cover a pocket until it has moved out of register with the chute and the concavity of the vane facing the loaded pocket bottom is calculated to sustain the weight of the material in the pocket until it has passed a sufficient distance below a horizontal plane through the ejector's axis to prevent the weight of the material pressing against the guards 24 and causing friction or wear there. I thus avoid any tendency to open the guards except when necessary to pass particles that might otherwise jam the ejector. In like manner the guards 37 on the opposite side will swing by gravity against the ejector and will intercept the free entry of air into the chute as the empty pockets move successively into receiving position. Each of these guards 37 working on the empty side of the ejector is provided with stop lugs 63 having set screws 64 adapted to engage a transverse stop bar 65 which serves to prevent them swinging in sufficiently to engage the shearing edges of the partitions but leaves each free to move outwardly independently, should conditions require it. Should there be any interruption in the operation of the ejector, it is only necessary to swing the gate 30 over to dotted line position, Fig. 1, and by operating the several valves 33 which control the chute 31 the ashes can be disposed of by hand in the present manner. The ashes delivered to the conveyor are all carried to one side and delivered to the hopper through which they pass to the crusher and thence to the elevator or equivalent discharge, thus affording a complete and compact mechanism for effective mechanical handling of ashes from any desired number of furnaces.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In an ash disposal apparatus, a chute, a rotary pocketed ejector adapted to discharge material from the chute, a rigid shearing shoulder extending along one side edge of the chute, shearing edges on the ejector pockets adapted to co-act with said shearing shoulder, a guard means hung on each side of the chute so as to project below said shoulder and adapted by engagement with the ejector to exclude air from entering the chute, the guard means being hung from their upper edges free to swing away from the ejector, as and for the purposes described.

2. The combination with a furnace of its grate, and an ash chute having throughout substantially the width of the furnace grate, a rotary ejector elongated to close the bottom end of the chute and discharge material therefrom, said ejector and chute having coacting clinker shearing elements and said ejector having pockets extending parallel with the axis of the ejector continuously throughout its length and which are open at the periphery thereof, freely swinging guard means on the side of the chute toward which the loaded pockets of the ejector move, a plurality of sectional hinged guards coacting with the empty pockets of the ejector, and stop means to limit the approach of the free ends of said latter guard sections to the ejector.

3. In a furnace having a mechanical stoker, an uninterrupted chute extending substantially the width of said stoker, a rotary sectional ejector in said chute having straight continuous pockets extending parallel with the axis of the ejector for the width of the chute, coacting clinker shearing members on the ejector and chute, and hinged sectional guards underhung from the chute on each side and co-acting with the straight pocket walls to exclude air from the chute.

4. In an ash disposal apparatus, a chute, and a rotary ejector for discharging material therefrom, hinged air excluding guards for said ejector, said ejector having webs parallel with the axis of the ejector curved in transverse cross section from its hub outwardly to present concave load supporting bottom surfaces for the loaded pockets adapted to support the material out of contact with the air excluding guards.

In testimony whereof I affix my signature.

SAMUEL STEWART.

Witness:
NOMIE WELSH.